United States Patent
Cotta

(10) Patent No.: US 11,087,591 B2
(45) Date of Patent: Aug. 10, 2021

(54) ANTI-FRAUD CLOUD GAMING BLOCKCHAIN

(71) Applicant: Sony Interactive Entertainment LLC, San Mateo, CA (US)

(72) Inventor: Bryan Cotta, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 16/228,452

(22) Filed: Dec. 20, 2018

(65) Prior Publication Data
US 2020/0202668 A1    Jun. 25, 2020

(51) Int. Cl.
*G07F 17/32* (2006.01)
*G06Q 20/12* (2012.01)
(Continued)

(52) U.S. Cl.
CPC ....... *G07F 17/3244* (2013.01); *G06Q 20/123* (2013.01); *G06Q 20/389* (2013.01); (Continued)

(58) Field of Classification Search
CPC ................ G06Q 20/123; G06Q 20/389; G06F 17/3244; H04L 9/0637
See application file for complete search history.

(56) References Cited

U.S. PATENT DOCUMENTS

| 8,128,476 B1 * | 3/2012 | Sidhu | A63F 3/00643 463/10 |
| 2009/0124350 A1 * | 5/2009 | Iddings | G07F 17/3262 463/25 |

(Continued)

FOREIGN PATENT DOCUMENTS

| CN | 107169865 A | 9/2017 |
| CN | 108985772 A | 12/2018 |

(Continued)

OTHER PUBLICATIONS

International Search Report and Written Opinion, dated Mar. 23, 2020, issued in corresponding International Patent Application No. PCT/US2019/065828 (14 pages).

(Continued)

*Primary Examiner* — Scott C Anderson
(74) *Attorney, Agent, or Firm* — Penilla IP, APC

(57) ABSTRACT

A method includes: processing a request to execute a purchase transaction for a virtual asset of a video game, to transfer ownership of the virtual asset from a first user account to a second user account, to transfer an amount of virtual currency from the second user account to the first user account; responsive to the request, accessing a blockchain to perform an anti-fraud verification, including analyzing data of a prior transaction involving the virtual asset that is stored to the blockchain; responsive to the anti-fraud verification providing a result that does not indicate fraudulent activity, then generating transaction data based on an identifier for the first user account, an identifier for the second user account, an identifier for the virtual asset, and the amount of virtual currency, and submitting the transaction data to a node network, to write the transaction data to a block of the blockchain.

12 Claims, 10 Drawing Sheets

(51) Int. Cl.
*G06Q 20/38* (2012.01)
*G06Q 20/40* (2012.01)
*H04L 9/06* (2006.01)

(52) U.S. Cl.
CPC ....... *G06Q 20/4016* (2013.01); *H04L 9/0637* (2013.01); *H04L 2209/38* (2013.01); *H04L 2209/56* (2013.01)

(56) References Cited

U.S. PATENT DOCUMENTS

| | | | |
|---|---|---|---|
| 2016/0342994 A1* | 11/2016 | Davis | G06Q 40/02 |
| 2017/0043257 A1* | 2/2017 | Kraly | A63F 13/45 |
| 2017/0046664 A1 | 2/2017 | Haldenby et al. | |
| 2017/0092060 A1* | 3/2017 | Toohey | G06F 16/254 |
| 2017/0345011 A1* | 11/2017 | Salami | G06Q 20/10 |
| 2018/0068097 A1* | 3/2018 | Collin | H04L 63/0892 |
| 2018/0293834 A1* | 10/2018 | Cage | G07F 17/329 |
| 2018/0322489 A1* | 11/2018 | Altenhofen | H04L 9/3239 |
| 2019/0102756 A1* | 4/2019 | Zhou | G06Q 20/3278 |
| 2019/0325433 A1* | 10/2019 | Hirsch | G07F 17/3255 |

FOREIGN PATENT DOCUMENTS

| | | |
|---|---|---|
| TW | 565853 U | 8/2018 |
| WO | 2017030771 A1 | 2/2017 |

OTHER PUBLICATIONS

Office Action, dated Dec. 14, 2020, issued in related Taiwanese Patent Application No. 108145759.

* cited by examiner

ANTI-FRAUD CLOUD GAMING BLOCKCHAIN

BACKGROUND

Field of the Disclosure

The present disclosure relates to systems and methods for using a cloud gaming blockchain to provide assurance and tracking of virtual asset transactions, and further providing for anti-fraud implementations.

Description of the Related Art

A current area of rapidly growing technology is the field of video gaming, now encompassing a multitude of gaming platforms, including dedicated gaming consoles, personal computers (PC), and more recently, cloud gaming and mobile devices. Gameplay often entails use of and development of virtual assets within the context of the video game. Such virtual assets are increasingly valuable to players and the market for the trade of video game related virtual assets is on the order of billions of dollars annually. As a result, networked gaming services/systems have struggled to provide adequate systems to handle the sale and trade of virtual assets while also protecting users against fraudulent transactions. It has been estimated that about 1 in 8 virtual items is lost to fraud. One example of a networked gaming service/system is the PlayStation® Network, which includes various gaming services supporting both console-based and cloud-based gaming.

In a cloud gaming setup, users are able to access a number of games on a cloud gaming site over a network, such as the Internet, and begin interaction/playing the game. In order to select a game for game play, a user accesses his/her account on the cloud gaming site, and initiates one of a plurality of games that are available to the user account for game play. The video generated from the cloud video game is transported to a client device. One example of a cloud gaming system is the Playstation® Now cloud gaming service.

It is within this context that embodiments of the disclosure arise.

SUMMARY OF THE DISCLOSURE

Implementations of the present disclosure provide methods and systems for using a cloud gaming blockchain to provide assurance and tracking of virtual asset transactions, and further providing for anti-fraud implementations.

In some implementations, a method is provided, including the following operations: processing a request to execute a purchase transaction for a virtual asset of a video game, the purchase transaction configured to transfer ownership of the virtual asset from a first user account to a second user account, the purchase transaction further configured to transfer an amount of virtual currency from the second user account to the first user account; responsive to the request, accessing a blockchain to perform an anti-fraud verification, the anti-fraud verification including analyzing data of a prior transaction involving the virtual asset that is stored to the blockchain, the blockchain being configured to store data for virtual asset transactions; responsive to the anti-fraud verification providing a result that does not indicate fraudulent activity, then generating transaction data based on an identifier for the first user account, an identifier for the second user account, an identifier for the virtual asset, and the amount of virtual currency, and submitting the transaction data to a node network, to write the transaction data to a block of the blockchain, wherein writing the transaction data to the block of the blockchain includes processing the transaction data to generate a transaction identifier, the transaction identifier configured to enable retrieval of the transaction data from the blockchain.

In some implementations, writing the transaction data to the blockchain includes accessing the blockchain to verify ownership of the virtual asset by the first user account, and accessing the blockchain to verify availability of the amount of the virtual currency from the second user account.

In some implementations the method further includes: receiving confirmation of the writing of the transaction data to the block of the blockchain; responsive to receiving the confirmation, then updating a registry of virtual assets to transfer ownership of the virtual asset from the first user account to the second user account.

In some implementations, performing the anti-fraud verification includes determining if the prior transaction of the virtual asset occurred within a predefined time period of the request.

In some implementations, performing the anti-fraud verification includes analyzing a geo-location associated with the prior transaction.

In some implementations, generating the transaction data is further based on state data that indicates a current state of the virtual asset.

In some implementations, the state data is defined by one or more fields having values that define attributes of the virtual asset.

In some implementations, the method further includes: detecting an update to the state data of the virtual asset; in response to detecting the update, generating update transaction data based on the identifier of the virtual asset and the updated state data of the virtual asset; submitting the update transaction data to the node network, to write the update transaction data to an additional block of the blockchain, wherein writing the update transaction data to the additional block of the blockchain includes processing the update transaction data to generate a second transaction identifier, the second transaction identifier configured to enable retrieval of the update transaction data from the blockchain.

In some implementations, detecting the update to the state data of the virtual asset is performed at a periodic interval.

In some implementations, detecting the update to the state data of the virtual asset is performed in response to completion of a game session of the video game.

In some implementations, detecting the update to the state data of the virtual asset is defined by detecting a change in a value of a field of the state data that exceeds a predefined threshold.

In some implementations, a method is provided, including the following operations: processing a request to execute a transaction of a virtual asset of a video game, the transaction configured to transfer ownership of the virtual asset from a first user account to a second user account; responsive to the request, accessing a blockchain to perform an anti-fraud verification, the anti-fraud verification including analyzing data of a prior transaction involving the virtual asset that is stored to the blockchain, the blockchain being configured to store data for virtual asset transactions; responsive to the anti-fraud verification providing a result that does not indicate fraudulent activity, then generating transaction data based on an identifier for the first user account, an identifier for the second user account, an identifier for the virtual asset, and state data that indicates a current state of the virtual asset, and submitting the transaction data to a node network, to write the transaction data to a block of a blockchain, the blockchain being configured to store data for virtual asset transactions; receiving confirmation of the writing of the transaction data to the block of the blockchain; responsive to receiving the confirmation, then updating a registry of virtual assets to transfer ownership of the virtual asset from the first user account to the second user account.

In some implementations, the state data is defined by one or more fields having values that define attributes of the virtual asset.

In some implementations, writing the transaction data to the blockchain includes verifying ownership of the virtual asset by the first user account.

In some implementations, the method further includes: detecting an update to the state data of the virtual asset; in response to detecting the update, generating update transaction data based on the identifier of the virtual asset and the updated state data of the virtual asset; submitting the update transaction data to the node network, to write the update transaction data to an additional block of the blockchain.

In some implementations, detecting the update to the state data of the virtual asset is performed at a periodic interval.

In some implementations, detecting the update to the state data of the virtual asset is performed in response to completion of a game session of the video game.

In some implementations, a method is provided, including the following operations: processing a request to execute a transaction of a first virtual asset and a second virtual asset, the first virtual asset and the second virtual asset being defined for use in gameplay of one or more video games, the transaction configured to transfer ownership of the first virtual asset from a first user account to a second user account, the transaction further configured to transfer ownership of the second virtual asset from the second user account to the first user account; responsive to the request, accessing a blockchain to perform an anti-fraud verification, the anti-fraud verification including analyzing data of a prior transaction involving the first virtual asset or the second virtual asset that is stored to the blockchain, the blockchain being configured to store data for virtual asset transactions; responsive to the anti-fraud verification providing a result that does not indicate fraudulent activity, then generating transaction data based on an identifier for the first user account, an identifier for the second user account, an identifier for the first virtual asset, an identifier for the second virtual asset, first state data that indicates a current state of the first virtual asset, and second state data that indicates a current state of the second virtual asset; submitting the transaction data to a node network, to write the transaction data to a block of a blockchain, the blockchain being configured to store data for virtual asset transactions; receiving confirmation of the writing of the transaction data to the block of the blockchain; responsive to receiving the confirmation, then updating a registry of virtual assets to transfer ownership of the first virtual asset from the first user account to the second user account, and to transfer ownership of the second virtual asset from the second user account to the first user account.

In some implementations, the first state data is defined by one or more fields having values that define attributes of the first virtual asset; and, wherein the second state data is defined by one or more fields having values that define attributes of the second virtual asset.

In some implementations, writing the transaction data to the blockchain includes verifying ownership of the first virtual asset by the first user account and verifying ownership of the second virtual asset by the second user account.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

DETAILED DESCRIPTION

Figure 1:
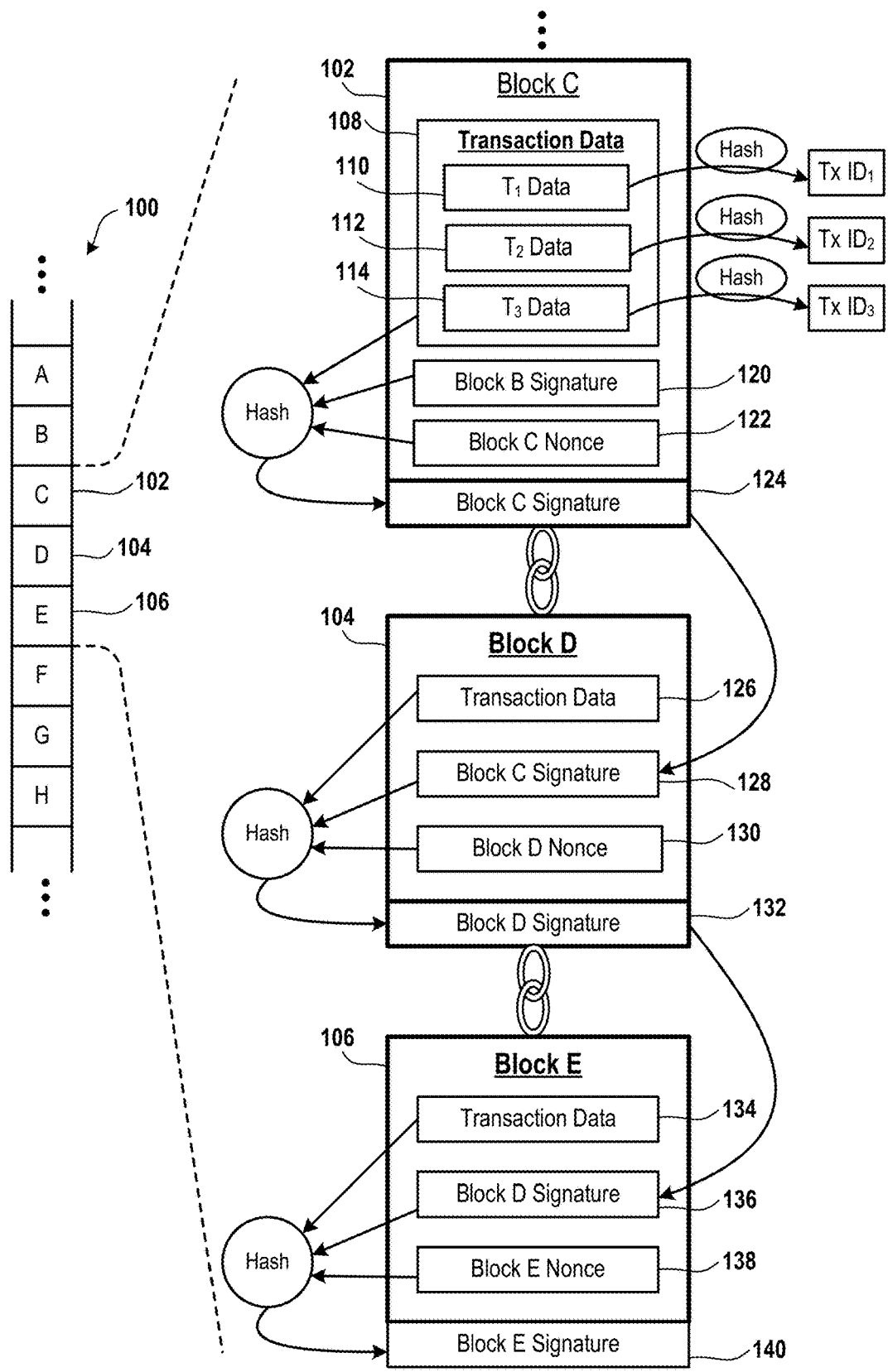
FIG. 1 conceptually illustrates a blockchain implementation configured to store virtual asset transactions, in accordance with implementations of the disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

As the field of video gaming continues to grow in popularity, so there is an ever greater abundance and diversity of virtual assets related to video games. There is large business in the sale and trading of game-related virtual assets, with a market estimated to be on the order of billions of dollars. Accordingly, implementations of the disclosure provide methods and systems that use blockchain technology to track virtual asset transactions.

Implementations of the disclosure provide for tracking of the sale and trading history of video game virtual assets via blockchain technology. This secures transactions and enables tracking of transactions that have taken place in relation to a given virtual asset, providing protection through a secure implementation of a blockchain wallet on a networked gaming service. A networked gaming service/system such as the PlayStation® Network can provide various gaming services supporting, for example, console/PC-based and cloud-based gaming.

In some implementations, the implementation of such a digital wallet can be on a per-game basis, such that a given game (or specific collection of games) may have its own digital wallet secured through a blockchain implementation. Implementations of the disclosure can employ a novel blockchain having its own root, and the integrity of the cloud compute is achieved via blockchain technology.

Additionally, in some implementations, transactions can be stored on a public blockchain. For example, encrypted data can be stored to a public blockchain (e.g. Ethereum blockchain, BitCoin blockchain, etc.) and a transaction number is obtained. The legitimacy of the data (e.g. for a virtual asset transaction) can be verified using a hash key match, enabling verification of data/transactions by users.

For example, if a user purchases a skin for a game, a hash value can be created using, by way of example without limitation, the user id, an identifier of the new skin, etc., which can be stored to the blockchain. A highly secure transaction is possible because there can be high availability to it, with multiple cloud assets/machines computing transactions, to ensure the integrity of these transactions. Blockchain hashing of the transaction can be employed, and multiple nodes in the cloud can perform a majority vote to ensure a particular value/result is authentic. So even if one part of the cloud is compromised or hacked, the data and the compute resources can still be secure.

For example, if a user buys a specific virtual asset, then that asset is associated with the user name/id of the user. Broadly speaking, for digital gaming assets to have value, they are associated with a user name. However, if there are fraudulent transactions such that such assets are stolen, a problem is that one no longer knows who the rightful owner is because they have changed hands so many times. But if blockchain technology is used to log such transactions, then one can trace back transactions to the rightful owner.

In some implementations, every digital asset has a serial number. In some implementations, the serial number of an asset and the user id can be hashed, and hashed in with a nonce and/or key to the blockchain, to generate the blockchain signature. So if the asset is stolen, then restoring asset back to its rightful owner is easier because the blockchain can be used to trace back the serial number of the asset back to the rightful owner's user id.

Virtual assets are typically stolen via account hacking, such as through phishing attempts, low security passwords, etc. A hacker will typically illegally access the user's account and then trade the asset from the user's account to the hacker's account. But if transactions are logged to the blockchain, then there can be attestation of the fraudulent transactions. For example, the hacker might trade the asset to their fraudulent account, and then immediately sell it off to another user. But with the transactions encoded to the blockchain, one can trace back to find the rightful owner of the asset when it is recovered, and the asset can be returned to the rightful owner.

The fraudulent account can thus be identified and actions can be taken such as preventing trading/buying/selling from the fraudulent account. Furthermore, the purchaser of the asset could be reimbursed for the amount they paid for the asset. This may be useful in restoring the parties to their states prior to the fraudulent transactions.

For ease of description, throughout the present disclosure, it will be appreciated that references to a "user" will often be synonymous with a user device that is associated to or operated by the user, as the user typically interfaces with systems in accordance with the present disclosure by using or operating a user device. Thus, while the term "user" is used for ease of description in the present disclosure, it will be appreciated that the term "user" can encompass both the user as well as a user device that is operated by the user or otherwise associated therewith, and further the terms "user" and "user device" may often be used interchangeably in the present description of the implementations, as will be apparent to those skilled in the art.

FIG. 1 conceptually illustrates a blockchain implementation configured to store virtual asset transactions, in accordance with implementations of the disclosure. In the illustrated implementation, a blockchain 100 is conceptually shown, including various blocks C, D, and E (refs. 102, 104, and 106, respectively), which are further detailed by expanded view. As will be appreciated by those skilled in the art, each block of the blockchain 100 is digitally linked to its neighboring blocks, e.g. through a digital signature process, so that any transactions stored to the blockchain are effectively immutable. Broadly speaking, this is accomplished through the blockchain's block addition process in which each successive block of the blockchain incorporates data based on the previous blocks, and must be agreed upon by a decentralized network of nodes before being accepted as part of the blockchain. Any attempted change to the data of a previous block will be detectable during verification of succeeding blocks, as other nodes will not reach the same verification result if the data from a previous block has been altered.

With continued reference to FIG. 1, in some implementations, blocks of the blockchain can be configured to store virtual asset transactions. For example, block C (ref. 102) includes transaction data 108 that describes the details of various virtual asset transactions. In the illustrated implementation, the block C includes data relating to transactions $T_1$, $T_2$, and $T_3$, represented by $T_1$ data 110, $T_2$ data 112, and $T_3$ data 114. It will be appreciated that transaction data for a given transaction can include any of various kinds of information, such as the user ID of a buyer, the user ID of a seller, the serial number or identifier of a virtual asset being purchased, an amount of virtual currency paid, a date and time of the transaction, etc.

In some implementations the transaction data for a given transaction is hashed to produce a transaction id (TXID). For example, $T_1$ data 110 can be hashed to produce $TXID_1$ 116, $T_2$ data 112 can be hashed to produce $TXID_2$ 118, and $T_3$ data 114 can be hashed to produce $TXID_3$ 120. The transaction ID's are provided to the parties to a given transaction and can be used to look up a given transaction stored to the blockchain.

In some implementations, to generate a digital signature for a given block, the block's transaction data, the digital signature of the previous block, and a nonce are hashed. In the illustrated implementation for block C, the transaction data 108, the signature of block B 120, and a block C nonce 122 are hashed to generate a block C signature 124. The nonce can be generated through a proof-of-work process, whereby an appropriate nonce is discovered that enables the hash result to fulfill a predefined constraint (e.g. hash result must be less than a predefined value, etc.). It will be appreciated that when the nonce is discovered and the signature produced by a mining node on the network, then the solution is verified by the network before block C is accepted to the blockchain.

As more and more transactions of virtual assets occur, they are added to the blockchain 100 using the above-described process. In some implementations, transaction data is continually collected, and when the amount of data reaches a predefined amount, then the transaction data is written to the blockchain.

In the illustrated implementation, additional details for blocks D and E are shown. Block D (ref. 104) includes transaction data 126 describing data of various virtual asset transactions, the signature of block C (ref. 128), and a block D nonce 130, which are hashed to produce the block D signature 132. Likewise, block D (ref. 106) includes transaction data 134 describing data of various virtual asset transactions, the signature of block D (ref. 136), and a block E nonce 138, which are hashed to produce the block E signature 140. In this way, block D incorporates data from block C (block C's signature), and block E incorporates data from block D (block D's signature), so that the blocks of the blockchain are digitally chained together in a manner such that transaction data written to the blockchain is effectively immutable.

Figure 2:
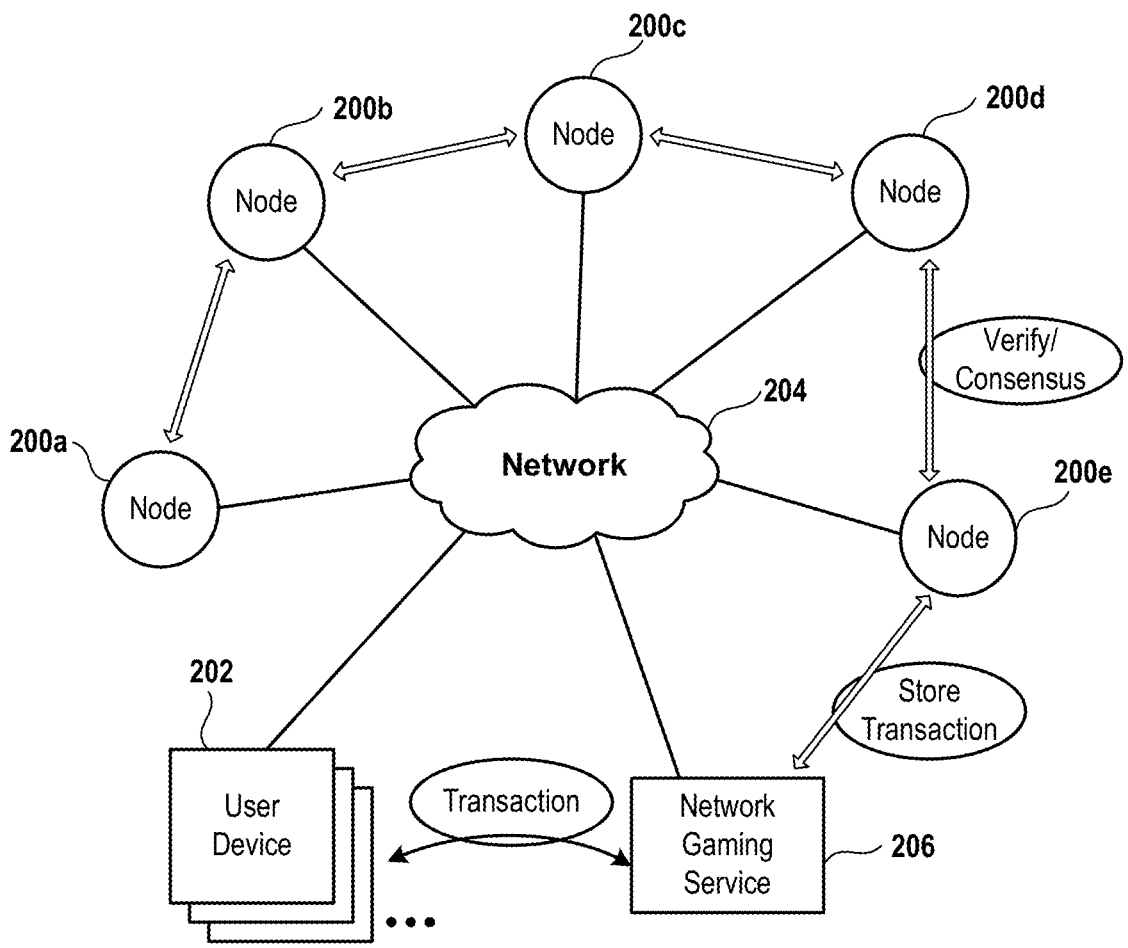
FIG. 2 conceptually illustrates a system for carrying out virtual asset transactions and storing them to a blockchain, in accordance with implementations of the disclosure.

FIG. 2 conceptually illustrates a system for carrying out virtual asset transactions and storing them to a blockchain, in accordance with implementations of the disclosure. In the illustrated implementation, one of more user devices 202 initiate virtual asset transactions relating to virtual assets that are utilized for one or more video games that function, at least in part, via a networked gaming service 206, accessed over network 204 which can include the Internet. In some implementations the networked gaming service 206 is a cloud gaming service that executes video game sessions and streams video game gameplay to the user devices. In some implementations the networked gaming service 206 does not perform cloud gaming, but is utilized for services associated to video games that are locally executed, e.g. by the user devices (e.g. game console, PC, portable/mobile device, etc.).

The networked gaming service 206 can facilitate virtual asset transactions. For example, the networked gaming service 206 may control the pool of available virtual assets that may be in circulation, and may further initially sell the virtual asset into circulation or facilitate buying and selling of virtual assets between users. In some implementations the networked gaming service 206 may also buy back and resell virtual assets.

It will be appreciated that such virtual asset transactions are stored to the blockchain by accessing a node network including a plurality of nodes 200a, 200b, 200c, 2000d, 200e, etc. The nodes are executed by compute devices such as servers and other computers or computing devices that communicate with each other over the network 204. The nodes maintain the blockchain and store virtual asset transactions to the blockchain using a consensus protocol which in some implementations may entail a proof of work verification process. By using a consensus protocol, the nodes effectively vote on the validity of blocks being written to the blockchain that include the virtual asset transaction data. In some implementations, to speed consensus, a proof of stake or delegated proof of stake process is employed.

It will be appreciated that not all nodes necessarily store the entire blockchain, but may store parts of the blockchain, and further not all nodes are necessarily involved in mining operations if utilized. But as virtual asset transactions are stored as part of blocks written to the blockchain, as the blocks are confirmed across the node network, so the transactions become confirmed and effectively immutable. In some implementations transactions are confirmed by being mined to a depth of a predefined number of blocks. It will be appreciated that the record kept by the blockchain is canonical regarding transactions involving the virtual assets. Changes in ownership of the virtual assets may only be effected by storing new transactions to the blockchain, as data that is already encoded/stored in blocks on the blockchain is effectively immutable.

Figure 3:
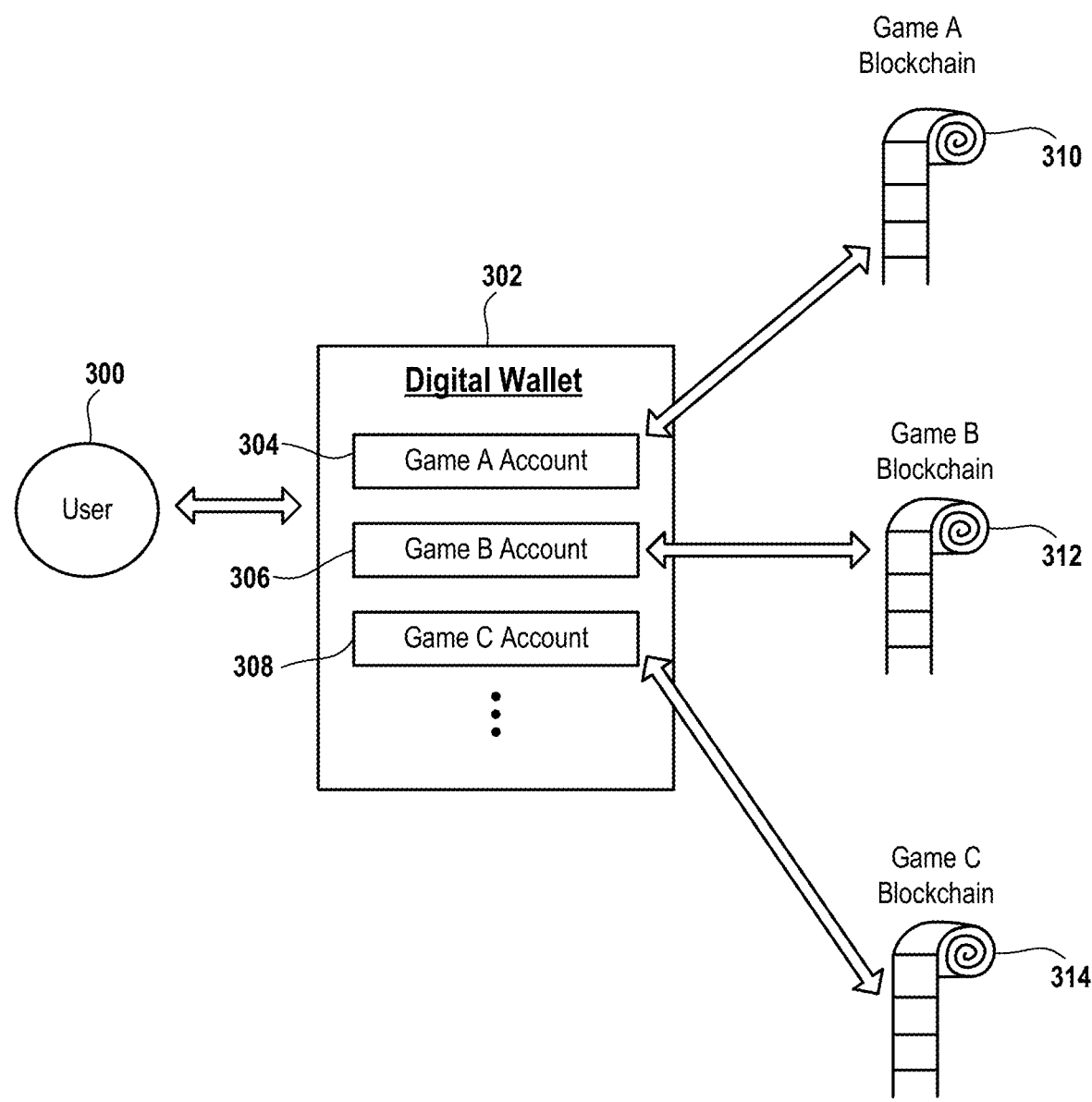
FIG. 3 conceptually illustrates a digital wallet and several game-specific blockchains, in accordance with implementations of the disclosure.

FIG. 3 conceptually illustrates a digital wallet and several game-specific blockchains, in accordance with implementations of the disclosure. As shown, a user 300 may have a digital wallet 302 that is defined by various game-specific accounts, such as a game A account 304, a game B account 306, a game C account 308, etc. Each game-specific account reflects the virtual assets for the given video game that are associated to or owned by the user 300.

Furthermore, in some implementations, game-specific blockchains are utilized to store virtual asset transactions pertaining to given video games. Thus, there may be a game A blockchain 310, a game B blockchain 312, a game C blockchain 314, etc. Accordingly, the transaction data pertaining to virtual assets for game A that are owned by user 300 is encoded to blockchain 310, the transaction data pertaining to virtual assets for game B that are owned by user 300 is encoded to blockchain 312, and the transaction data pertaining to virtual assets for game C that are owned by user 300, is encoded to blockchain 314.

In the illustrated implementation, there are several different blockchains for storage of virtual asset transactions for different video games. However, in some implementations the virtual asset transactions of different video games can be stored to the same blockchain.

Figure 4:
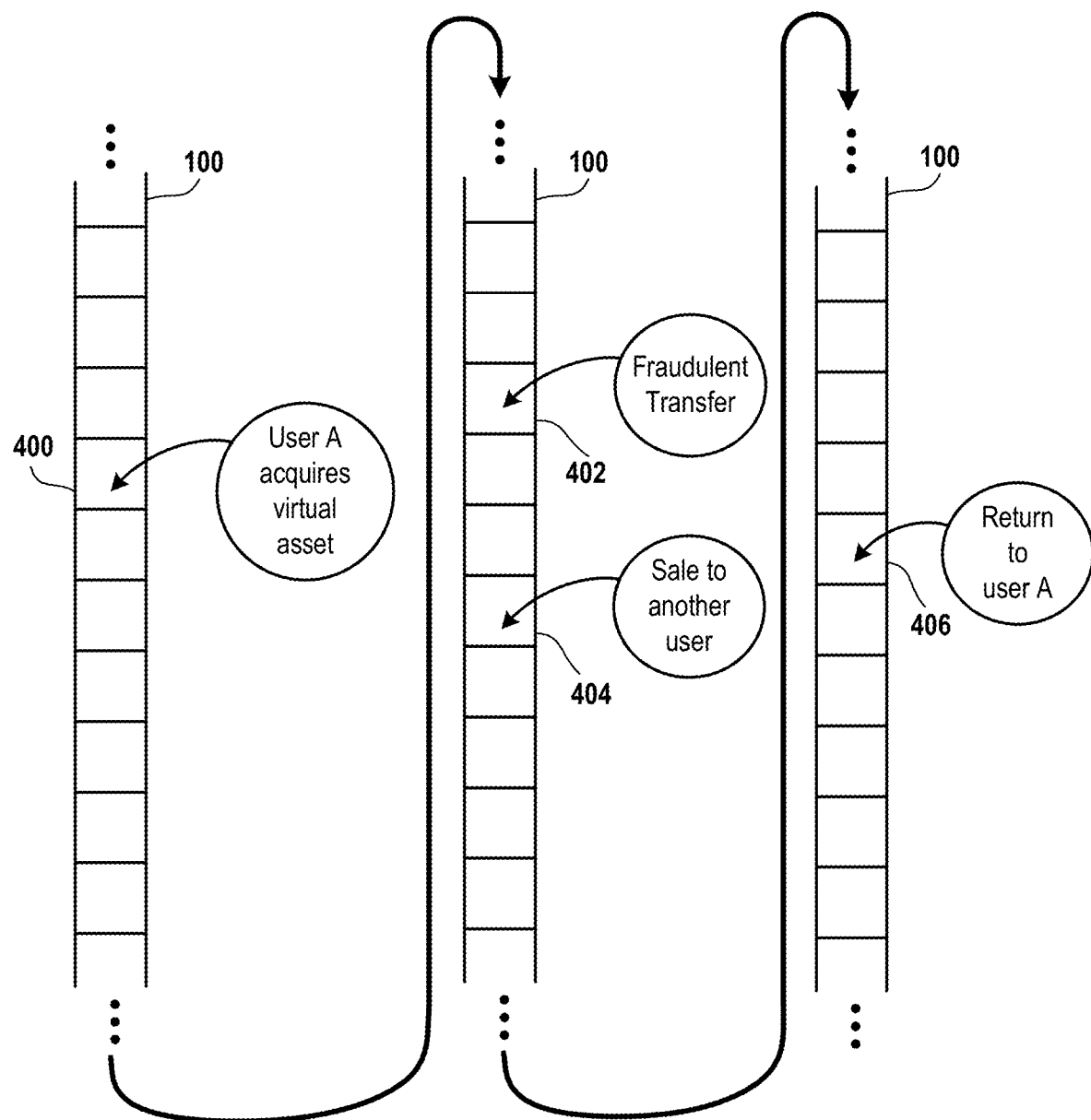
FIG. 4 conceptually illustrates a series of transactions concerning a given virtual asset, logged to a blockchain, in accordance with implementations of the disclosure.

FIG. 4 conceptually illustrates a series of transactions concerning a given virtual asset, logged to a blockchain, in accordance with implementations of the disclosure. As shown in the illustrated implementation, virtual asset transactions are stored to a blockchain 100. In a block 400, a transaction is recorded in which a user A acquires a virtual asset. For example, the virtual asset may be purchased from another user or from a networked gaming service, e.g. using virtual currency. In some implementations the virtual asset may be earned by the user A through gameplay activity or other activity related to the video game.

However, a fraudulent transfer of the virtual asset to another user account occurs, and is encoded to the blockchain 100. For example, user A's account might be hacked by a malicious party, and the malicious party may transfer the virtual asset to their own account. It will be appreciated that this is a fraudulent transfer, as the user A did not request the transfer; however, this fraudulent transfer of the virtual asset will be recorded to the blockchain 100 at block 402, and thus the blockchain record will reflect that the virtual asset is now owned by the account of the malicious party.

In a typical scenario, the malicious party does not intend to keep the virtual asset, but rather seeks to sell it for virtual/real currency in order to profit from the fraudulent transaction. Thus, the malicious party may sell the virtual asset to another user, and the sale transaction is stored to the blockchain at block 404. Again, though the transaction involves a stolen virtual asset, the transaction is nonetheless stored to the blockchain in an immutable manner.

At some point, the user A may discover that their virtual asset has been stolen, and report it to the networked gaming service. Because transaction data is stored to the blockchain 100, the blockchain can be searched to find transactions involving the virtual asset. The complete transaction history of the virtual asset can be surfaced from searching the blockchain 100, and thus, the transactions including the fraudulent transfer of the virtual asset to the malicious party's account and the subsequent sale to the other user can be discovered. The networked gaming service may thus use the blockchain 100 to investigate the fraudulent activity, and from the transaction data, identify the fraudulent account that was used to transfer the virtual asset, and also determine the rightful owner of the virtual asset.

The networked gaming service may therefore take actions such as flagging the fraudulent account of the malicious party, blocking any further transactions using the fraudulent account (e.g. trading, buying, or selling virtual assets), or subjecting the account to heightened scrutiny or monitoring of activity (e.g. setting alerts for virtual asset transactions or other activity, subjecting future transactions from the account to additional review or processing). Furthermore, the networked gaming service may also return the virtual asset to the rightful owner, user A. It will be appreciated that this entails executing another transaction to transfer the virtual asset from the other user that bought the virtual asset from the malicious party, back to the original owner, user A. This transaction will also be recorded to the blockchain 100 at block 406 in the illustrated implementation.

In some implementations, the networked gaming service may further reimburse the other user for the amount (e.g. of virtual currency) that they paid for the virtual asset. This may often be the lowest cost solution to the issue of the fraudulent transactions. For the malicious party will typically sell a stolen virtual asset for below market value in order to quickly dispossess the virtual asset and convert it to currency, and thus reimbursing the other user that purchased the virtual asset from the malicious party costs less than issuing another copy of the virtual asset. Indeed, in some implementations the virtual asset may be unique or scarce and therefore issuing another copy of the virtual asset may not be feasible.

In some implementations, the networked gaming service includes a blockchain monitor that monitors the blockchain for suspicious transactions, or transactions meeting certain predefined conditions for suspicious activity. Examples include transfer of a virtual asset for an amount significantly less than an expected market value of the virtual asset (e.g. based on recent historical transactions involving the same or similar virtual asset type), trade of assets where the expected market values of the traded assets differs by greater than a predefined amount, gifting of a virtual asset to another user that does not have prior social contact (e.g. chat interactions, shared gameplay events, messaging, social graph membership, etc.) with the gifting user (or does not have a minimum amount of prior social contact), two or more transactions involving the same virtual asset occurring within a relatively short or predefined time period (as may occur when a malicious user transfers a virtual asset and then immediately resells it), transactions from an account that is being accessed from an unusual geo-location or time zone (e.g. based on historical access locations) or at an unusual time (e.g. based on historical account access/activity times), combinations thereof, etc. The blockchain monitor may flag such interactions as suspicious and issue notifications based on their detection, such as notifications to either of the parties involved in such a transaction (e.g. private message/notification, e-mail alert, text alert, etc.), or notifications to operators of the networked gaming service, e.g. flagging suspicious interactions for additional review or investigation. It will be appreciated that the data (e.g. geo-location data, timing data, user account data, etc.) used to enable detection of suspicious activity can be stored to the blockchain in association with virtual asset transactions, and thus detection of suspicious/fraudulent activity may entail accessing the blockchain.

Figure 5:
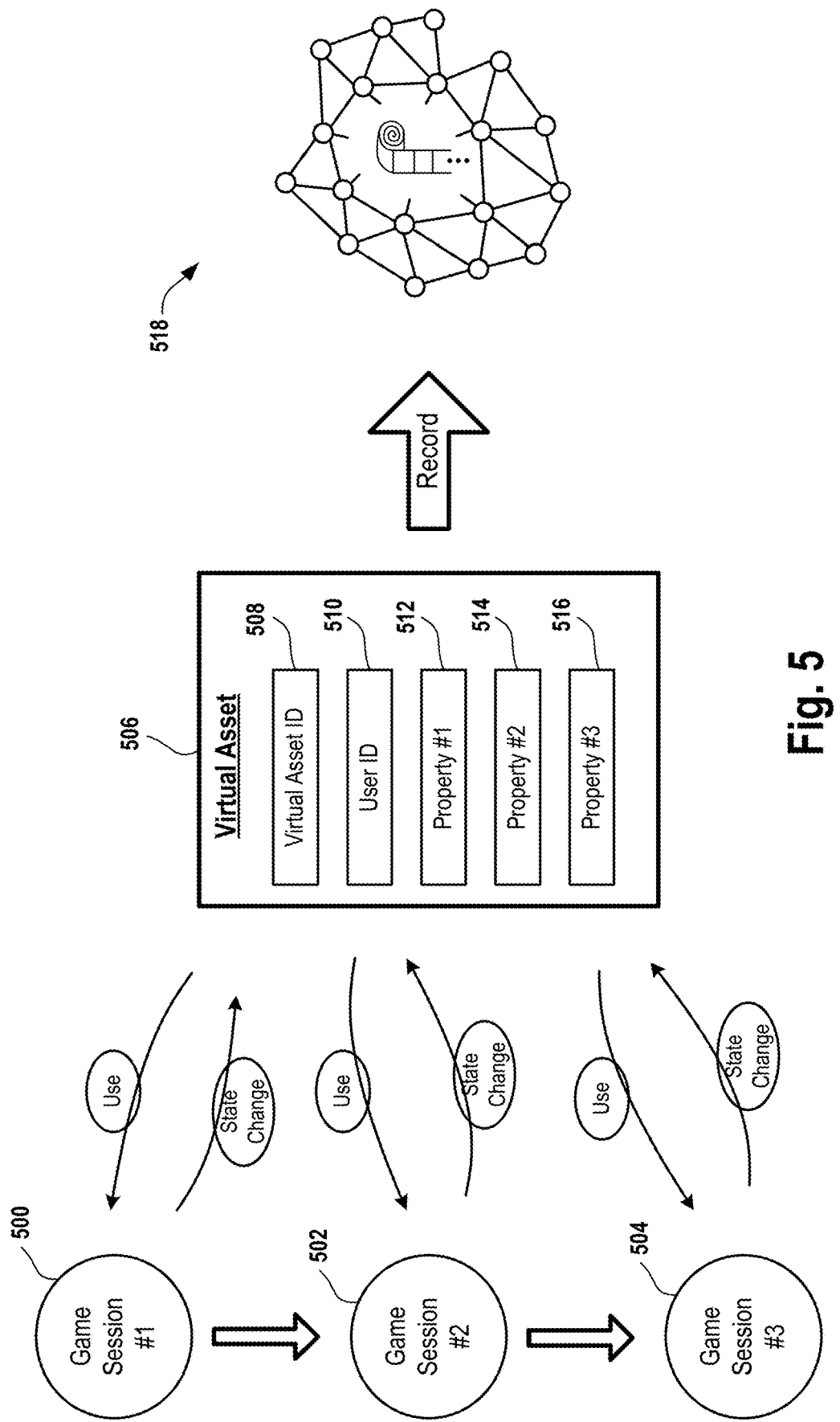
FIG. 5 conceptually illustrates changes to a virtual asset being recorded to a blockchain, in accordance with implementations of the disclosure.

FIG. 5 conceptually illustrates changes to a virtual asset being recorded to a blockchain, in accordance with implementations of the disclosure. While transactions such as buying, selling, or trading virtual assets are described as being stored on a blockchain, it will be appreciated that some virtual assets can change over time, for example depending on use or user customization or other features of the virtual asset that may be altered. In the illustrated implementation, a virtual asset 506 is conceptually shown as it is tracked through several gaming sessions. The virtual asset 506 has a virtual asset identifier (ID) 508, that is a serial number or other type of identifier that uniquely identifies the virtual asset 508. Further, the virtual asset 506 is associated to a specific user ID 510, which in some implementations indicates that the virtual asset 506 is owned by or associated to the account of the user ID 510.

Additionally, the virtual asset 506 includes various properties/attributes 512, 514, 516, etc. One or more of the properties of the virtual asset 506 can be configured to be adjustable and may change over time. For example during or after a game session 500, the virtual asset 506 may be used in-game, and as a result there may be a change in state of the virtual asset 506 that changes one or more of its properties. These changes can be recorded the blockchain by the nodes 518 that maintain the blockchain, so as to incorporate the current state of the virtual asset 506 into the next block of the blockchain, which may include values of properties of the virtual asset.

For example, the virtual asset may be a character, such as a player in a sports video game, and the properties of the character may change through use and/or customization. Such changes in the properties of the character can thus be tracked and written to the blockchain, enabling tracking of the character's state over time via the blockchain. It will be appreciated that by tracking a virtual asset's state via the blockchain, such information can be used to revert the virtual asset to a prior state, such as when a fraudulent transaction is discovered as discussed above.

During or after additionally successive game sessions 502 and 504, the resulting changes to the virtual asset 506 can again be recorded to the blockchain, so that the current state of the virtual asset, including the values of specific properties of the virtual asset are maintained on the blockchain. In this manner, the current state of a virtual asset can be verified, e.g. by a potential buyer of the virtual asset, by referencing the blockchain.

In some implementations a virtual asset may have its current state stored to the blockchain at periodic intervals, following predefined or significant events (e.g. a change in a property value exceeding a threshold), following gaming sessions, etc.

It will be appreciated that a virtual asset as understood in the context of the present disclosure, can include any tradeable virtual good (e.g. capable of being bought, sold, or traded), having utility in the context of a video game. Merely by way of example without limitation, some virtual assets include weapons, ammunition, shields, armor, clothing, vehicles, resources, colors, artwork, skins, health, lives, abilities, spells, potions, characters, accessories, articles, objects, etc.

As noted above, a given virtual asset may change over time, such as by changes that occur through in-game use of the virtual asset or as administered by the video game over time or through experience. For example, an article might change in appearance over time or through accumulation of gameplay experience, and the changes in appearance will be recorded to the blockchain. In another example, an object might be upgraded in some way by the user, e.g. by purchasing an upgrade using credits, resources, or other virtual currency. Again, such upgrades will be recorded to the blockchain, so that the state of the object is immutably stored with a particular timestamp.

In some implementations, when storing the current state of a virtual asset to the blockchain, data associated to a prior state is incorporated into the transaction data for the current state. In some implementations, a hash of the prior transaction data or prior state data can be incorporated into the current state data (and, e.g., can be further hashed to produce a transaction ID).

Additionally, it will be appreciated that by storing and tracking virtual assets using the blockchain as presently described, the scarcity of a given virtual asset or type of virtual asset can be guaranteed. That is, as the blockchain is canonical for the existence of virtual assets of a given type, then all virtual assets of the given type can be represented and accounted for on the blockchain. In this manner, only the virtual assets of the given type that are represented on the blockchain are in existence/circulation, and thus their scarcity is guaranteed. Furthermore, a given virtual asset having a certain state, e.g. having certain properties of customization, can be protected from duplication.

Figure 6:
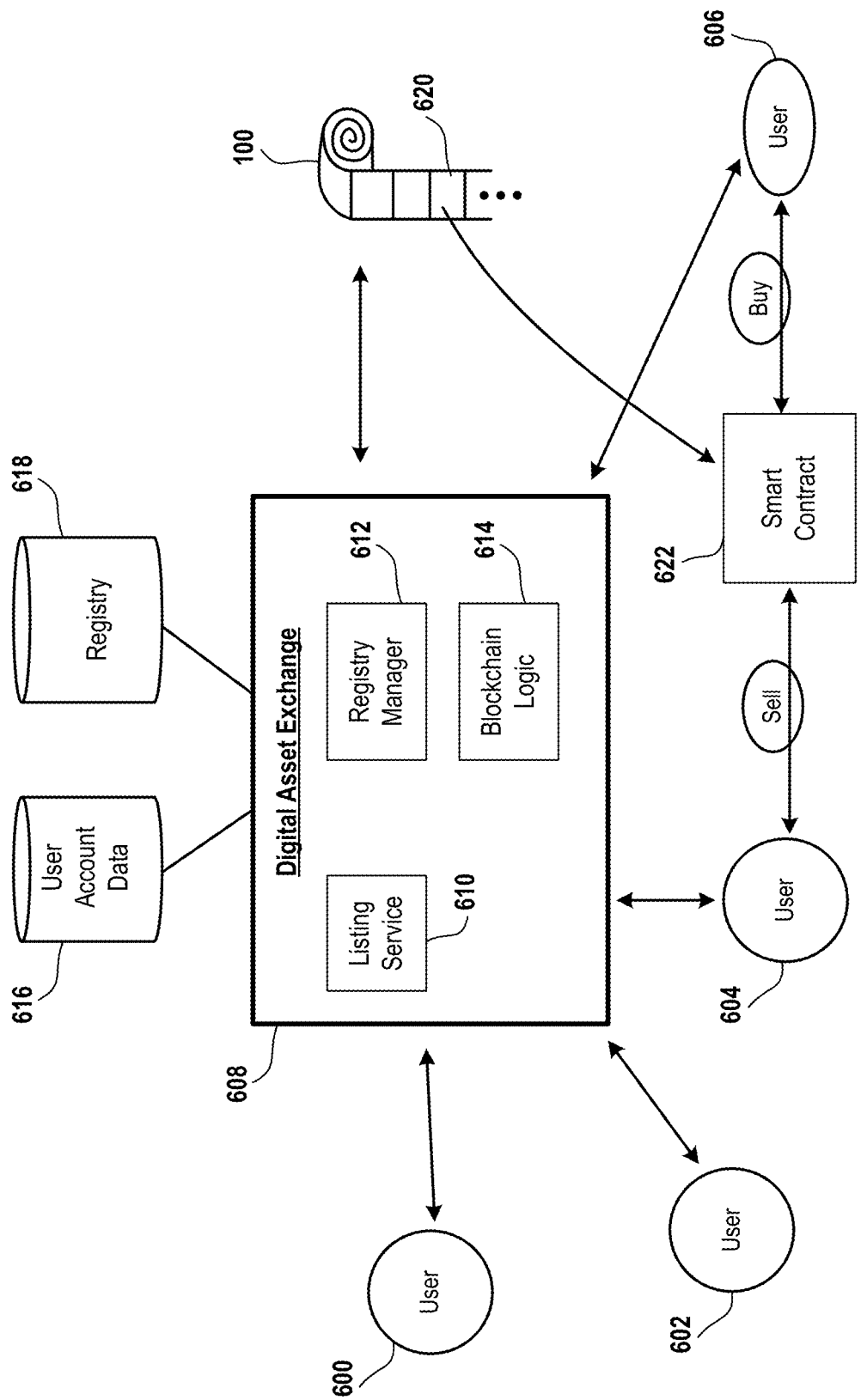
FIG. 6 conceptually illustrates a system for facilitating trade of virtual assets, in accordance with implementations of the disclosure.

FIG. 6 conceptually illustrates a system for facilitating trade of virtual assets, in accordance with implementations of the disclosure. As shown, various users 600, 602, 604, and 606, access (via respective user devices) a digital asset exchange 608. The digital asset exchange 608 is configured to match sellers of virtual assets with potential buyers.

For example, in some implementations the digital asset exchange 608 provides a listing service 610 wherein sellers may list their virtual assets for sale, and may set a desired selling price. In some implementations, buyers may also provide listings indicating their wanting to buy virtual assets, and may set a desired purchase price. In some implementations, the digital asset exchange 608 provides a search engine to enable users to search listings for virtual assets, including both for-sale type listings and want-to-buy type listings. In some implementations search results can be filtered and/or sorted based on various parameters, such as price, date of listing, properties, etc. In some implementations, the search engine enables users to search for virtual assets and their owners, so that a user may initiate a communication (e.g. using a communication service such as a chat/private message/e-mail service) to an asset owner making an offer to purchase their virtual asset.

In some implementations, the digital asset exchange 608 includes a registry manager 612 that accesses a registry 618 of virtual asset metadata, e.g. identifying virtual assets, their owners, and their current states. The registry 618 provides an easily searchable repository of current information about virtual assets, that can be synchronized to the information stored in the blockchain 100. The registry 618 can thus be used to facilitate searches as described above. The digital asset exchange 608 also accesses user account data 616, e.g. to facilitate transactions or communications between users. By way of example without limitation, such user account data may include identifier and login information, virtual currency account balances and information, gameplay history, transaction history, etc.

It will be appreciated that transactions of virtual assets carried out via the digital asset exchange 608 will be added to the blockchain 100. The digital asset exchange 608 thus includes blockchain logic 614 to carry out operations for writing virtual asset transactions to the blockchain 100. Blockchain logic 614 can be further configured to carry out verification operations in support of a virtual asset transaction, such as verifying ownership, authenticity, availability of virtual currency amounts, etc. through the blockchain 100. In this manner, transactions can be safer for both buyer and seller, as virtual assets and availability of consideration (e.g. virtual currency amount) can be verified, and the transaction carried out after such has been verified. It will be appreciated that the blockchain logic 614 can be implemented by one or more nodes of the node network, and that verification operations may be carried out as part of the process of attempting to write the transactions to the blockchain. In some implementations, after a transaction is confirmed as having been written to the blockchain, then the registry 618 is updated to reflect the transaction.

In some implementations the verification operations carried out by the blockchain logic can include anti-fraud verification operations, such as checking for any of the previously described suspicious transaction activity. It will be appreciated that detection of such activity can entail accessing/searching the blockchain to determine and analyze prior transactions involving a given virtual asset. If a suspicious transaction is detected, then the system may issue notifications, require additional verification (e.g. additional/two-factor authentication), prevent transactions from occurring, flag transactions for further review, etc.

In some implementations, the blockchain 100 may support smart contracts, which are self-executing in some capacity. For example, in the illustrated implementation the block 620 of the blockchain 100 may include a smart contract 622 configured to execute a transaction between the user 604 and the user 606. For example, the user 604 may be selling a virtual asset while the user 606 seeks to buy the virtual asset. The smart contract 622 can be configured to deliver the virtual asset to the buyer upon payment of an agreed upon amount of virtual currency. The smart contract 622 is self-executing, so that the transaction can be essentially non-refutable.

In another implementation, a smart contract can be configured to execute a want-to-buy type transaction, such that a buyer may indicate via a smart contract a desired purchase price for a requested virtual asset, and any seller fulfilling transfer of the requested virtual asset to the buyer will automatically be paid the purchase price set by the buyer.

It will be appreciated that a smart contract can be configured to provide even more complex transaction functionality. For example, in some implementations a smart contract can be configured to set a time limit for a sale of a virtual asset. A seller may thus list a virtual asset for sale for a limited duration of time.

In some implementations, a smart contract can be configured to enable installment payments over time. For example, the virtual asset is transferred upon payment of an initial amount, and additional payments are made on a recurring schedule until a predefined total amount has been paid. If payments are not made for some reason, then the virtual asset can be automatically returned to the seller, and optionally some or all of the amount paid to date returned to the buyer, as governed by the smart contract. In another implementation, the virtual asset is not transferred to the buyer until the predefined total purchase price has been received by the seller. Optionally, there may be a time limit for such an implementation, such that if fulfillment of the total purchase price does not take place within the time limit, then all amounts paid to date are returned to the buyer, and the virtual asset is not transferred.

In some implementations, a smart contract can be configured to enable multiple purchasing possibilities as set by the seller, such as various types of acceptable trades (e.g. one or more other virtual assets, one or more virtual currency or resource amounts, combinations thereof).

In some implementations, a smart contract can be configured to make transfer of a virtual asset contingent on fulfillment of a gaming activity-related condition. For example, the smart contract can be configured so that the virtual asset is transferred from the seller to the buyer if the buyer plays a video game as a member of the seller's team, and optionally, achieves a certain gameplay metric (e.g. number of points, kills, etc.). In this manner, the seller may condition sale of the virtual asset on gameplay assistance provided by the buyer, and buyers may trade their skill in gameplay for virtual assets.

In some implementations a smart contract can be configured to execute an auction for a virtual asset. For example, the smart contract may accept bids for a virtual asset over a predefined time period, and at the close of the time period, automatically transfer the virtual asset to the highest bidder in exchange for the winning bid amount.

Figure 7:
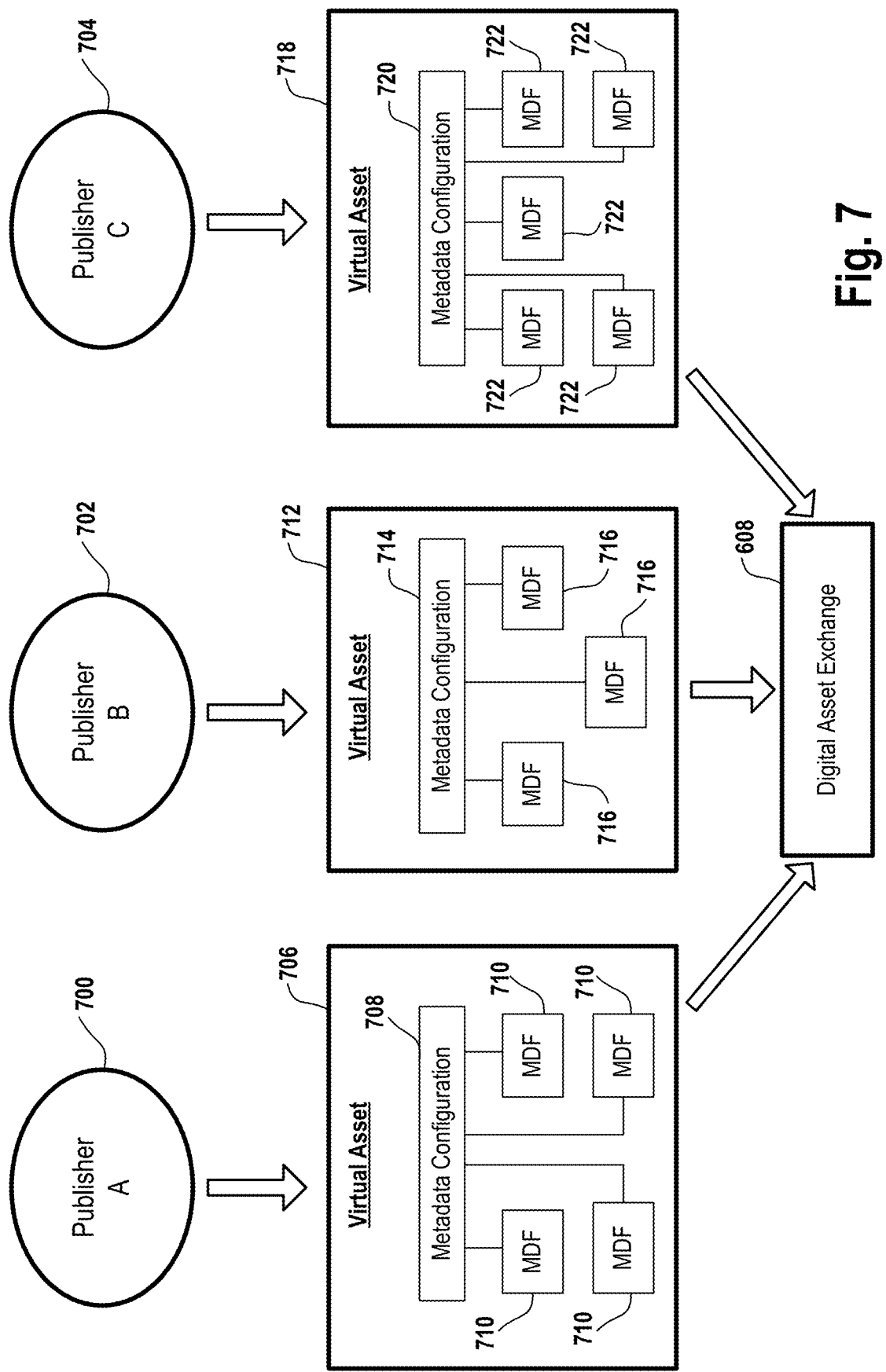
FIG. 7 conceptually illustrates various publishers using configurable metadata to customize virtual asset information, in accordance with implementations of the disclosure.

FIG. 7 conceptually illustrates various publishers using configurable metadata to customize virtual asset information, in accordance with implementations of the disclosure. In some implementations virtual assets have configurable metadata, enabling publishers to utilize different metadata schemes to specify properties of their virtual assets. For example, in the illustrated implementation the video game publisher 700 may define a virtual asset 706 with a metadata configuration 708 that defines the virtual asset as having metadata fields 710 associated therewith. Similarly, the video game publisher 702 may define a virtual asset 712 with a metadata configuration 714 that defines the virtual asset as having metadata fields 716 associated therewith; and the video game publisher 704 may define a virtual asset 718 with a metadata configuration 720 that defines the virtual asset as having metadata fields 722 associated therewith.

As indicated, the different video game publishers may employ different metadata configurations, such as different numbers of metadata fields and/or different types of metadata fields, for their respective virtual assets. By way of example without limitation, types of metadata fields can include fields for numeric values, text values, or other types of values or data which may be used to describe or define properties of a virtual asset. In this way, different publishers can specify different numbers and types of attributes for their virtual assets.

By using configurable metadata for the virtual assets, virtual assets from different publishers can more easily be traded via the same digital asset exchange 608. This enables virtual assets from different publishers, and from different games, to be bought/sold/traded on the same platform. Furthermore, virtual assets from different publishers and/or games can be traded for each other in some implementations.

As noted, implementations of the disclosure can be applied to cloud gaming systems. One example of a cloud gaming system is the Playstation® Now cloud gaming system. In such a system, the client device can be a game console, such as a Playstation® 4 game console, or may be another device such as a personal computer, laptop, tablet, cell phone, mobile device, etc.

Broadly speaking, to enable cloud gaming, several operations are performed by one or more servers within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to the user. Game data associated with a game can include generic game data and user specific game data. Therefore, initializing the files can include identifying, loading, and initializing both generic game data and user specific game data. Initializing generic game data may include initializing a graphics engine, installing graphics data, initializing sound files, installing art work, etc. Initializing user specific data may include locating, transferring, and installing user data, user history, game history, etc.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, certain initial content may be rendered and a selection/navigation screen may be presented for user selection and customization. User selection input provided at the selection/navigation screen may include game level selection, game icon(s) selection, game mode selection, game winnings, other user-related data that may require uploading of additional game content. In some embodiments, game content is made available by streaming the game content from the game cloud system to a user's computing device for viewing and interacting. In some implementations, after loading user specific data, the game content is available for game play.

Figure 8A:
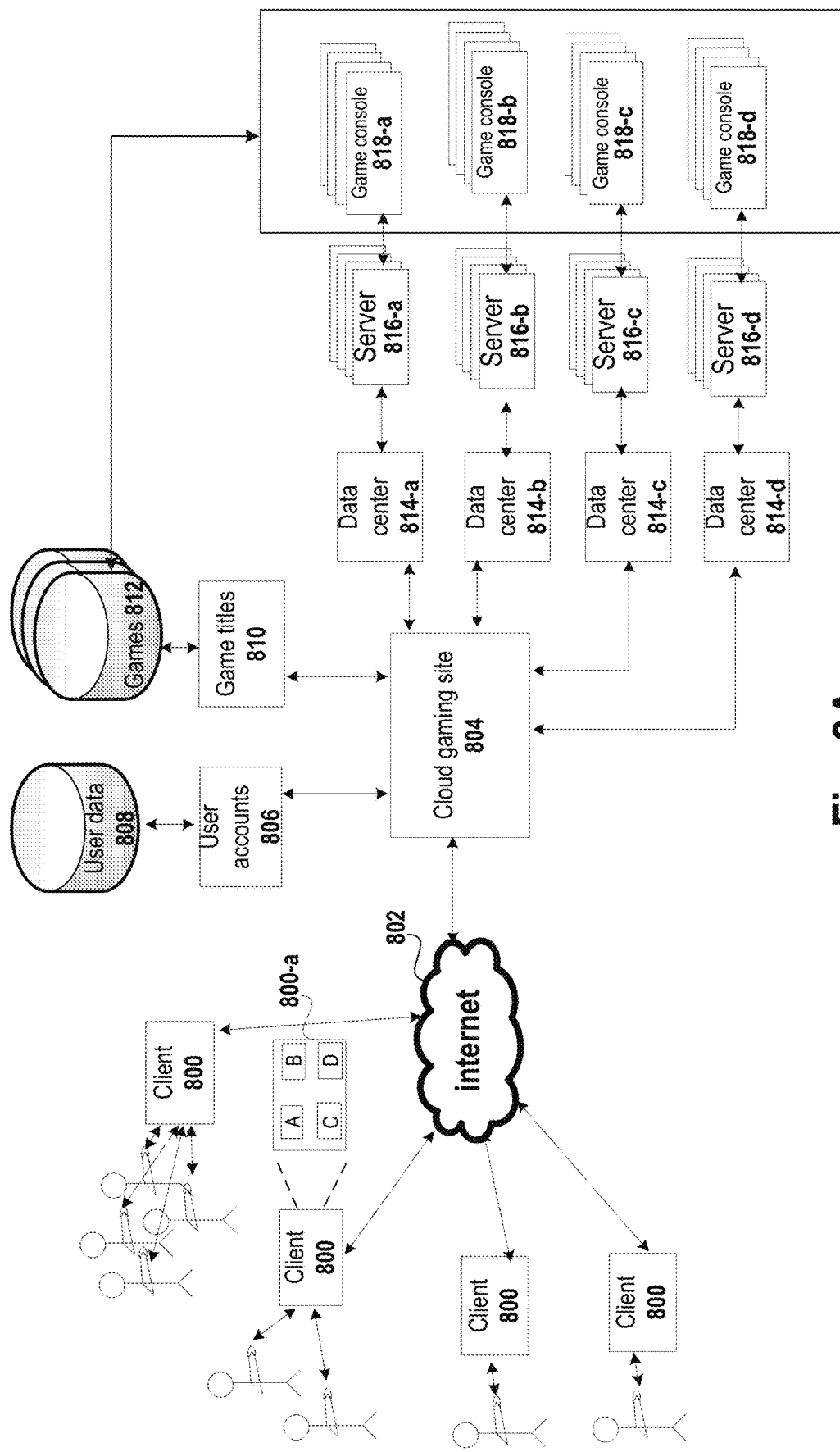
FIG. 8A illustrates an exemplary system used to load game files for a game available through a cloud gaming site, in accordance with implementations of the disclosure.

FIG. 8A illustrates an exemplary system used to load game files for a game available through a cloud gaming site. The system includes a plurality of client devices 800 that are communicatively connected to the cloud gaming site 804 over a network 802, such as the Internet. When a request to access the cloud gaming site 804 is received from a client device 800, the cloud gaming site 804 accesses user account information 806 stored in a user data store 808 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 810 to identify the game titles that are available at the game cloud site for the user account initiating the request. The game titles data store 810, in turn, interacts with a games database 812 to obtain the game titles for all the games that are available for the cloud gaming site. As new games are introduced, the games database 812 will be updated with the game code and the game titles data store 810 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 800-*a*, as shown in FIG. 8A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 8B:
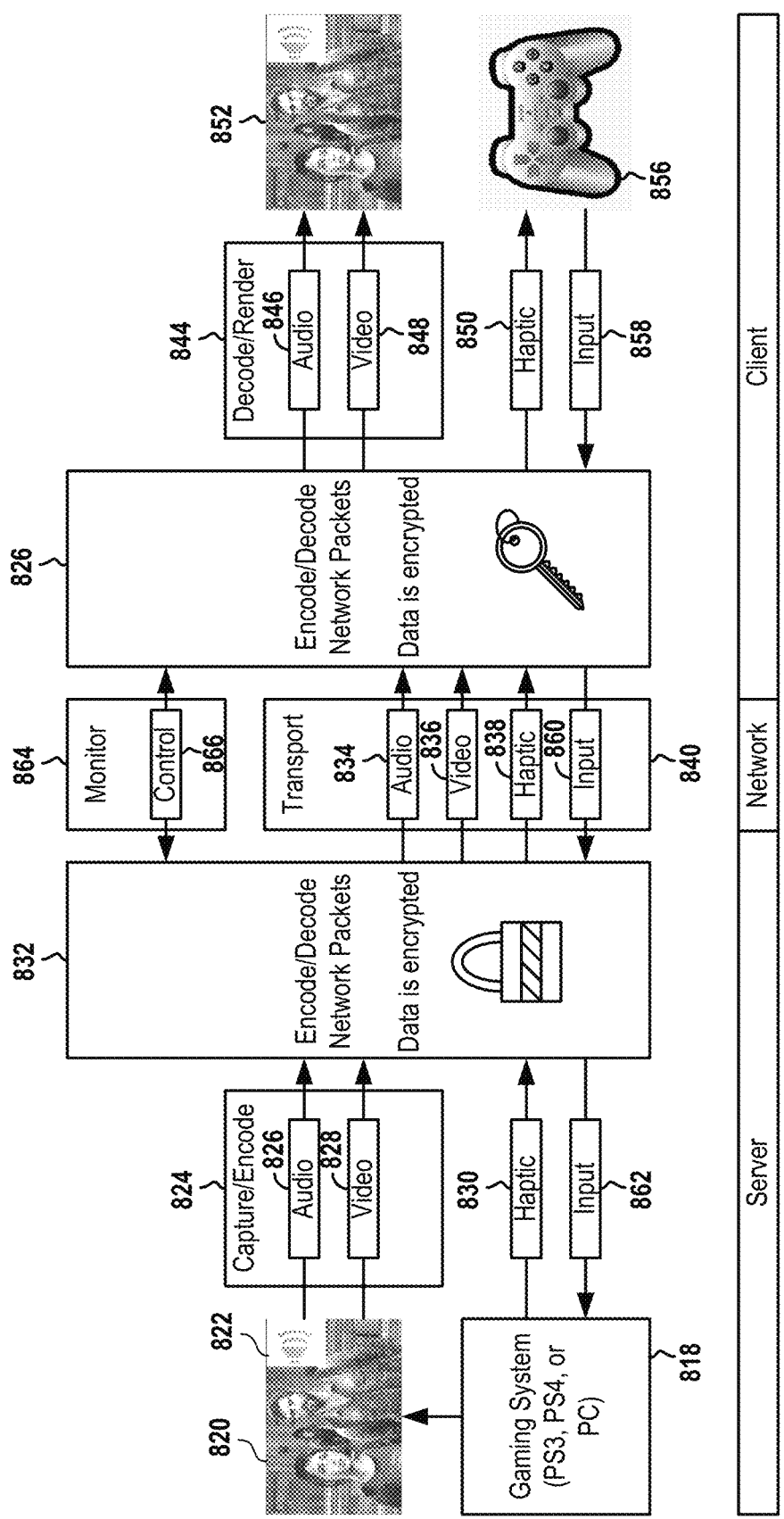
FIG. 8B is a flow diagram conceptually illustrating various operations which are performed for streaming a cloud video game to a client device, in accordance with implementations of the disclosure.

FIG. 8B is a flow diagram conceptually illustrating various operations which are performed for streaming a cloud video game to a client device, in accordance with implementations of the disclosure. The gaming system 818 executes a video game and generates raw (uncompressed) video 820 and audio 822. The video 820 and audio 822 are captured and encoded for streaming purposes, as indicated at reference 824 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 826 and encoded video 828 are further packetized into network packets, as indicated at reference numeral 832, for purposes of transmission over a network such as the Internet. The network packet encoding process can also employ a data encryption process, thereby providing enhanced data security. In the illustrated implementation, audio packets 834 and video packets 836 are generated for transport over the network, as indicated at reference 840.

The gaming system 818 additionally generates haptic feedback data 830, which is also packetized into network packets for network transmission. In the illustrated implementation, haptic feedback packets 838 are generated for transport over the network, as further indicated at reference 840.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 840, the audio, video, and haptic feedback packets are transported over a network, such as and/or including the Internet. As indicated at reference 842, the audio packets 834, video packets 836, and haptic feedback packets 838, are decoded/reassembled by the client device to define encoded audio 846, encoded video 848, and haptic feedback data 850 at the client device. If the data has been encrypted, then the network packets are also decrypted. The encoded audio 846 and encoded video 848 are then decoded by the client device, as indicated at reference 844, to generate client-side raw audio and video data for rendering on a display device 852. The haptic feedback data 850 can be processed/communicated to produce a haptic feedback effect at a controller device 856 or other interface device through which haptic effects can be rendered. One example of a haptic effect is a vibration or rumble of the controller device 856.

It will be appreciated that a video game is responsive to user inputs, and thus, a similar procedural flow to that described above for transmission and processing of user input, but in the reverse direction from client device to server, can be performed. As shown, a user operating controller device 856 may generate input data 858. This input data 858 is packetized at the client device for transport over the network to the cloud gaming system. The input data packets 860 are unpacked and reassembled by the cloud gaming server to define input data 862 on the server-side. The input data 862 is fed to the gaming system 818, which processes the input data 862 to update the game state of the video game.

During transport (ref. 840) of the audio packets 834, video packets 836, and haptic feedback packets 838, the transmission of data over the network can be monitored to ensure the cloud game stream quality of service. For example, network conditions can be monitored as indicated by reference 864, including both upstream and downstream network bandwidth, and the game streaming can be adjusted in response to changes in available bandwidth. That is, the encoding and decoding of network packets can be controlled based on present network conditions, as indicated by reference 866.

Figure 9:
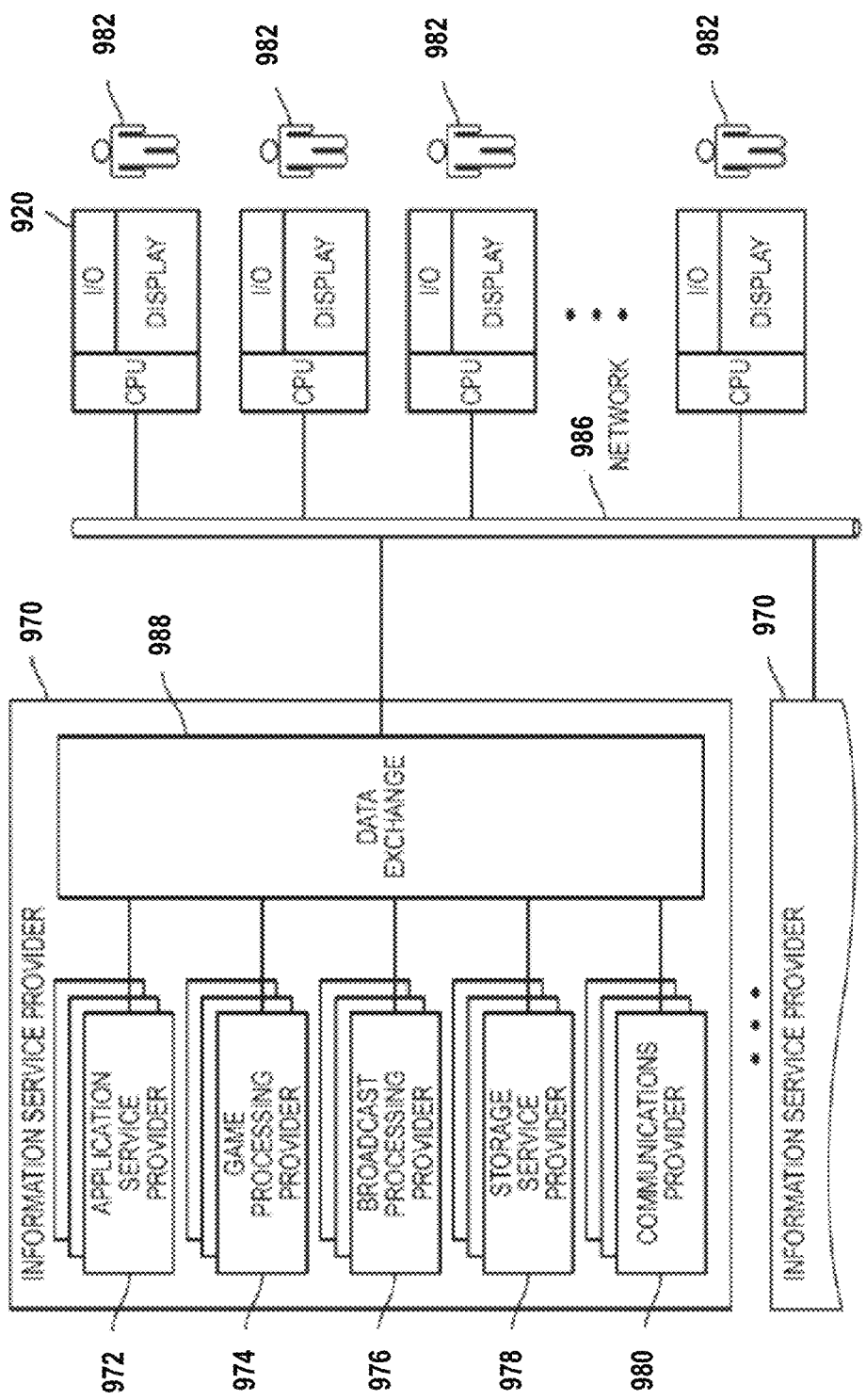
FIG. 9 illustrates an embodiment of an Information Service Provider architecture, in accordance with implementations of the disclosure.

FIG. 9 illustrates an embodiment of an Information Service Provider architecture. Information Service Providers (ISP) 970 delivers a multitude of information services to users 982 geographically dispersed and connected via network 986. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 970 includes Application Service Provider (ASP) 972, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 970 includes a Game Processing Server (GPS) 974 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 976 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 978 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 980 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 988 interconnects the several modules inside ISP 970 and connects these modules to users 982 via network 986. Data Exchange 988 can cover a small area where all the modules of ISP 970 are in close proximity, or can cover a large geographic area when the different modules are geographically dispersed. For example, Data Exchange 988 can include a fast Gigabit Ethernet (or faster) within a cabinet of a data center, or an intercontinental virtual area network (VLAN).

Users 982 access the remote services with client device 984, which includes at least a CPU, a memory, a display and I/O. The client device can be a PC, a mobile phone, a netbook, tablet, gaming system, a PDA, etc. In one embodiment, ISP 970 recognizes the type of device used by the client and adjusts the communication method employed. In other cases, client devices use a standard communications method, such as html, to access ISP 970.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A method, comprising:
  processing a request to execute a purchase transaction for a virtual asset of a video game, the virtual asset being interactively used during gameplay of the video game, the purchase transaction configured to transfer ownership of the virtual asset from a first user account to a second user account, the purchase transaction further configured to transfer an amount of virtual currency from the second user account to the first user account;
  responsive to the request, accessing a blockchain to retrieve data of a prior transaction involving the virtual asset that is stored to the blockchain, and performing an anti-fraud verification by analyzing said data of the prior transaction, the blockchain being configured to store data for virtual asset transactions;
  responsive to the anti-fraud verification providing a result that does not indicate fraudulent activity, then generating transaction data based on an identifier for the first user account, an identifier for the second user account, an identifier for the virtual asset, and the amount of virtual currency, wherein generating the transaction data is further based on state data that indicates a current state of the virtual asset as determined by said interactive use of the virtual asset, wherein the state data is defined by one or more fields having values that define attributes of the virtual asset that are adjusted by said interactive use, and
  submitting the transaction data to a node network, that writes the transaction data to a block of the blockchain, wherein writing the transaction data to the block of the blockchain includes processing the transaction data to generate a transaction identifier, the transaction identifier configured to enable retrieval of the transaction data from the blockchain.

2. The method of claim 1, wherein writing the transaction data to the blockchain includes accessing the blockchain to verify ownership of the virtual asset by the first user account, and accessing the blockchain to verify availability of the amount of the virtual currency from the second user account.

3. The method of claim 1, further comprising:
  receiving confirmation of the writing of the transaction data to the block of the blockchain;
  responsive to receiving the confirmation, then updating a registry of virtual assets to transfer ownership of the virtual asset from the first user account to the second user account.

4. The method of claim 1, wherein performing the anti-fraud verification includes determining if the prior transaction of the virtual asset occurred within a predefined time period of the request.

5. The method of claim 1, wherein performing the anti-fraud verification includes analyzing a geo-location associated with the prior transaction.

6. The method of claim 1, further comprising:
  detecting an update to the state data of the virtual asset;
  in response to detecting the update, generating update transaction data based on the identifier of the virtual asset and the updated state data of the virtual asset;
  submitting the update transaction data to the node network, to write the update transaction data to an additional block of the blockchain, wherein writing the update transaction data to the additional block of the blockchain includes processing the update transaction data to generate a second transaction identifier, the second transaction identifier configured to enable retrieval of the update transaction data from the blockchain.

7. The method of claim 6, wherein detecting the update to the state data of the virtual asset is performed at a periodic interval.

8. The method of claim 6, wherein detecting the update to the state data of the virtual asset is performed in response to completion of a game session of the video game.

9. The method of claim 6, wherein detecting the update to the state data of the virtual asset is defined by detecting a change in a value of a field of the state data that exceeds a predefined threshold.

10. The method of claim 1, wherein the one or more fields have values that define an appearance of the virtual asset.

11. The method of claim 1, wherein the one or more fields have values that define an upgrade level of the virtual asset.

12. The method of claim 1, wherein the virtual asset is a character of the video game, and wherein the one or more fields have values that define properties of the character.

* * * * *